(12) United States Patent
Pellenc

(10) Patent No.: US 7,719,231 B2
(45) Date of Patent: May 18, 2010

(54) EQUILIBRATED CHARGING METHOD FOR A LITHIUM-ION OR LITHIUM-POLYMER BATTERY

(75) Inventor: Roger Pellenc, Pertuis (FR)

(73) Assignee: Pellenc (Societe Anonyme), Pertuis (FR)

( * ) Notice: Subject to any disclaimer, the term of this patent is extended or adjusted under 35 U.S.C. 154(b) by 952 days.

(21) Appl. No.: 10/579,914

(22) PCT Filed: Nov. 18, 2004

(86) PCT No.: PCT/FR2004/002945

§ 371 (c)(1),
(2), (4) Date: May 19, 2006

(87) PCT Pub. No.: WO2005/055358

PCT Pub. Date: Jun. 16, 2005

(65) Prior Publication Data

US 2009/0039830 A1    Feb. 12, 2009

(30) Foreign Application Priority Data

Nov. 20, 2003 (FR) ................................. 03 13570

(51) Int. Cl.
*H02J 7/00* (2006.01)
(52) U.S. Cl. .................. 320/132; 320/158; 320/116; 320/136

(58) Field of Classification Search ............... 320/116, 320/136, 158, 163, 132, 159, 164
See application file for complete search history.

(56) References Cited

U.S. PATENT DOCUMENTS

| | | | | |
|---|---|---|---|---|
| 5,600,247 A | * | 2/1997 | Matthews | .................. 324/426 |
| 5,773,159 A | | 6/1998 | Beard | |
| 5,773,959 A | | 6/1998 | Teofilo et al. | |
| 5,880,575 A | | 3/1999 | Itou et al. | |
| 5,889,385 A | * | 3/1999 | Podrazhansky et al. | ..... 320/130 |

FOREIGN PATENT DOCUMENTS

| | | |
|---|---|---|
| GB | 2 372 645 | 8/2002 |
| JP | 8-19188 | 1/1996 |
| JP | 8-213055 | 8/1996 |

* cited by examiner

*Primary Examiner*—Edward Tso
*Assistant Examiner*—Aaron Piggush
(74) *Attorney, Agent, or Firm*—Young & Thompson

(57) ABSTRACT

An equilibrated charging method for n cells of a lithium-ion or lithium-polymer battery, connected in series. The method is characterised in carrying out a continuous monitoring of the levels of charge of the different cells (1), from the beginning of the operation of charging the battery (2) and during the process and, as a function of the analysis of the levels of charge, to carry out a uniform supply to all the cells (1), or an equilibration of the levels of charge of the cells (1), by supplying the same in different manners, as a function of the levels of charge thereof.

18 Claims, 5 Drawing Sheets

EQUILIBRATED CHARGING METHOD FOR A LITHIUM-ION OR LITHIUM-POLYMER BATTERY

The present invention relates to the field of charging or the charge of rechargeable batteries, and has for its object a process for charging or the balanced charge of cells of a lithium ion or lithium polymer battery.

Optimum electrical charging of batteries comprising several constituent cells, poses problems difficult to solve, particularly when the number of elements or cells in series is high.

In the case of a lithium ion or lithium polymer battery, there is added to these problems the optimization of the charge of the different elements or cells, risks of irremediable deterioration of said elements or said cells in the case of overcharging, particularly by overheating or over-voltage.

It is known on the one hand that in batteries which use lithium ion or lithium polymer elements in series, the performances of capacitance of each element or cell after charging are not identical and that these differences increase from cycle to cycle of charging and discharging until the end of the life of the battery in question.

It is known, on the other hand, that the lithium ion and lithium polymer batteries cannot be overcharged on the occasion of charging, nor undercharged on the occasion of use (discharge). The value of maximum retained voltage, by way of example and not in a limiting sense, for the overcharge for each of the elements of a lithium ion and lithium polymer battery in series, is 4.20 volts and the retained tension to stop discharge, and thereby avoid degradation of the battery, is 2.70 volts.

It is generally that, for each of the lithium ion or lithium polymer elements or cells, the voltage at the terminals of the element or of the cell is the image of the capacitance stored in the element or the cell in question. This indication of voltage does not give the precise value of capacitance in ampere/hours or in watt/hours, but gives a percentage of the capacitance of the element in question at the time of measuring this voltage.

Figure 1:
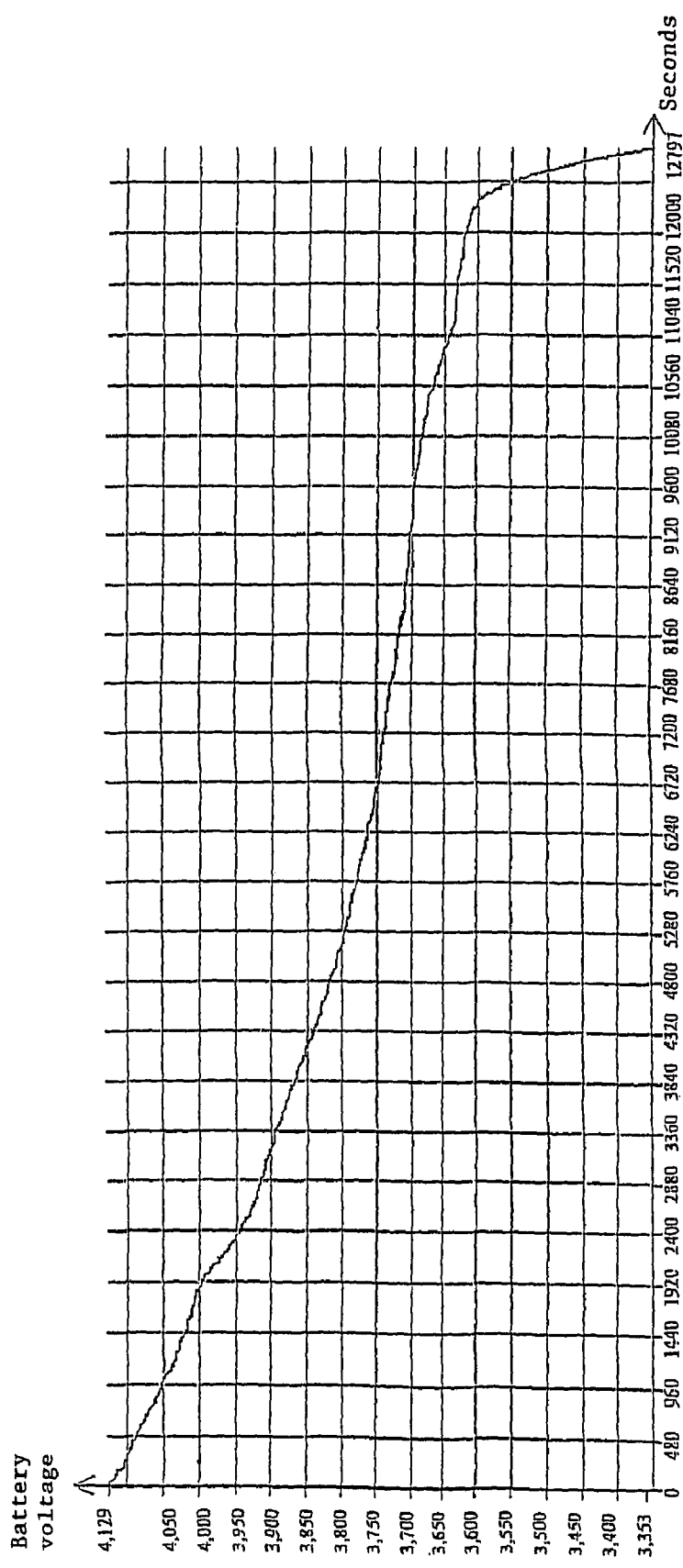

FIG. 1 of the accompanying drawings shows a curve showing the development of the voltage at the terminals of a lithium ion element relative to its capacitance (in the case of the discharge curve with constant current, the time is proportional to the percentage of the capacitance stored in the lithium ion element in question, wherein: 0 sec=>95% (4.129 volts), 6.150 seconds=>50% (3.760 volts) and 12.300 seconds=>0% (3.600 volts). It should be noted that over an important portion of this curve, the capacitance is substantially linear before rapidly degrading. To control the operations of charge and discharge of a lithium ion element or cell, operation is conducted in the substantially linear portion, which permits affirming that the voltage is the image of the capacitance.

Given the indications developed in the three preceding points, it can be verified that, in a battery constituted by more than three to four lithium ion or lithium polymer elements in series, the charging of the battery will be stopped when the most highly charged element will have reached 4.20 volts and, conversely, during discharge, the latter will be stopped when the element of least capacitance will have reached the voltage of 2.70 volts: it is hence the element which has the lowest capacitance which determines the overall capacitance of the battery. This permits understanding that, when the battery has a large number of elements in series, the risk of not using all of the capacitance of the battery is real, because it is the least capacitative element which determines in a limiting manner the total capacitance of the battery. Moreover, this phenomenon worsens as the charging/discharging cycles accumulate.

This phenomenon of unbalanced charging is essentially caused by the differences of capacitance and of internal resistance between the constituent elements of the battery, these differences resulting from the variation of the quality of production of the lithium ion or lithium polymer elements.

So as to optimize the capacitance of the battery over time, which is very important for the cost of use, it is necessary to overcome the problem stated above by providing, before stopping the charge, a rebalancing of all the elements or all the cells of the battery. This balancing will permit charging 100% of all the elements no matter what their capacitance.

In the present state of the art, this balancing takes place at the end of charging, by deriving the charge current of the element charged to 100%, which is to say when this latter has reached a voltage of 4.20 volts. Thus, the elements are thus stopped when they reach 4.20 volts and there is thus obtained a charge of 100% of all the elements at the end of the charging operation.

But this known balancing technique at the end of charging has notable drawbacks.

Thus, these balancing systems require resistances of important magnitude to be able to dissipate the consequent currents, and this the more so as the balancing system enters into action when the charge currents are greater still, which takes place when the elements of the battery are very unbalanced.

Moreover, this great dissipation of power gives rise to a consequent increase of temperature, which can be troublesome in the case of compact batteries integrating derivative resistances.

Moreover, it could happen that, despite the injection of large charging currents toward the end of the charging operation, the battery will not be balanced when the end of charging condition is fulfilled.

Furthermore, in high power applications, the recharging time of the battery, particularly for complete recharging, is long, even very long. It thus frequently happens that the effective charging time between two phases of discharge will be too short to terminate the charging operation, and the charge is thus interrupted whilst the unbalances between the elements or cells are still not compensated (in the case of the presence of a balancing system at the end of charge according to the prior art). The repetition of these phenomena gives rise to rapid degradation of the performance of the battery in question.

The present invention has for its object to propose an optimized charging solution, having the mentioned advantages and overcoming the previously mentioned drawbacks with respect to the state of the art.

To this end, the invention has for its object a process for balanced charging of n cells, with $n \geq 2$, constituting a lithium ion or lithium polymer battery and associating in series, each cell being comprised of one or several elements mounted in parallel, this processing being characterized in that it consists in continuously providing, from the beginning of the charging operation of the batteries and throughout the course of this operation, a surveillance of the charge levels of the different cells, and in carrying out, as a function of said evaluation of said charge levels, either a uniform supply of all the cells, or a balancing of said levels of charge of said cells by supplying these latter in a differentiated manner as a function of their current charge levels.

The steps of the process mentioned above can be carried out in two different manners, according to two technologically different implementations.

Thus, by using a solution based essentially on an analog technology, the surveillance of the charge levels is carried out in a continuous manner and the differentiated supply is carried out as soon as, and as long as, the differences of charge level, between the most and least charged cells, exceeds a predetermined threshold value.

As a modification, using a preferred solution which uses a digital processing of the signals and a management of the process by a digital processing unit, the surveillance of the charge levels is carried out by repeated measurements and the differentiated supply applied during a predefined time, in case of verification of the conditions of this equilibrium of the required charge levels.

This second solution permits simplifying both the material and the software implementations necessary for practicing the process.

As to this second solution, the process consists preferably in triggering for each cell of the battery, one after the other, in a sequential manner during fractional duration of the total charge time of the battery, sequences comprising a refreshed evaluation of the charge level of the cell in question, followed, as a function of its charge level and in relation to all the charge levels of the other cells of the battery, a uniform or differentiated supply, this according to a repetitive cycle all during the charging operation.

According to an advantageous embodiment of the invention, said process comprises at least the execution of the following operations under the management of a digital processing unit, and this from the beginning of charging:

evaluation, preferably at regular intervals, of the quantity of energy stored in each cell by measuring an indicative parameter of said quantity;

comparative analysis of the different quantities of energy evaluated or the different values of the measured parameter;

determination of the tardiest cell to charge, and, as the case may be, of the cell or cells most advanced in charging;

supplying the different cells mounted in series in a uniform manner or with limitation of the charge current for the cells other than the most retarded or most advanced, by derivation of all or a portion of said current at the level of this or these latter;

sequential repetition of the different said operations until there is obtained an end of charge condition of the battery or the detection of a default, of a dysfunction or of the exceeding of a permissible threshold value.

The experiments and work of the applicant have shown that this sequential balancing process distributed all during the charge permits having all the elements or cells constituting the battery charged at the same percentage at a given instant of charging, and thus to achieve 100% capacity for all the elements constituting the battery at the end of charging, and this independently of their own capacitance.

Figure 2:
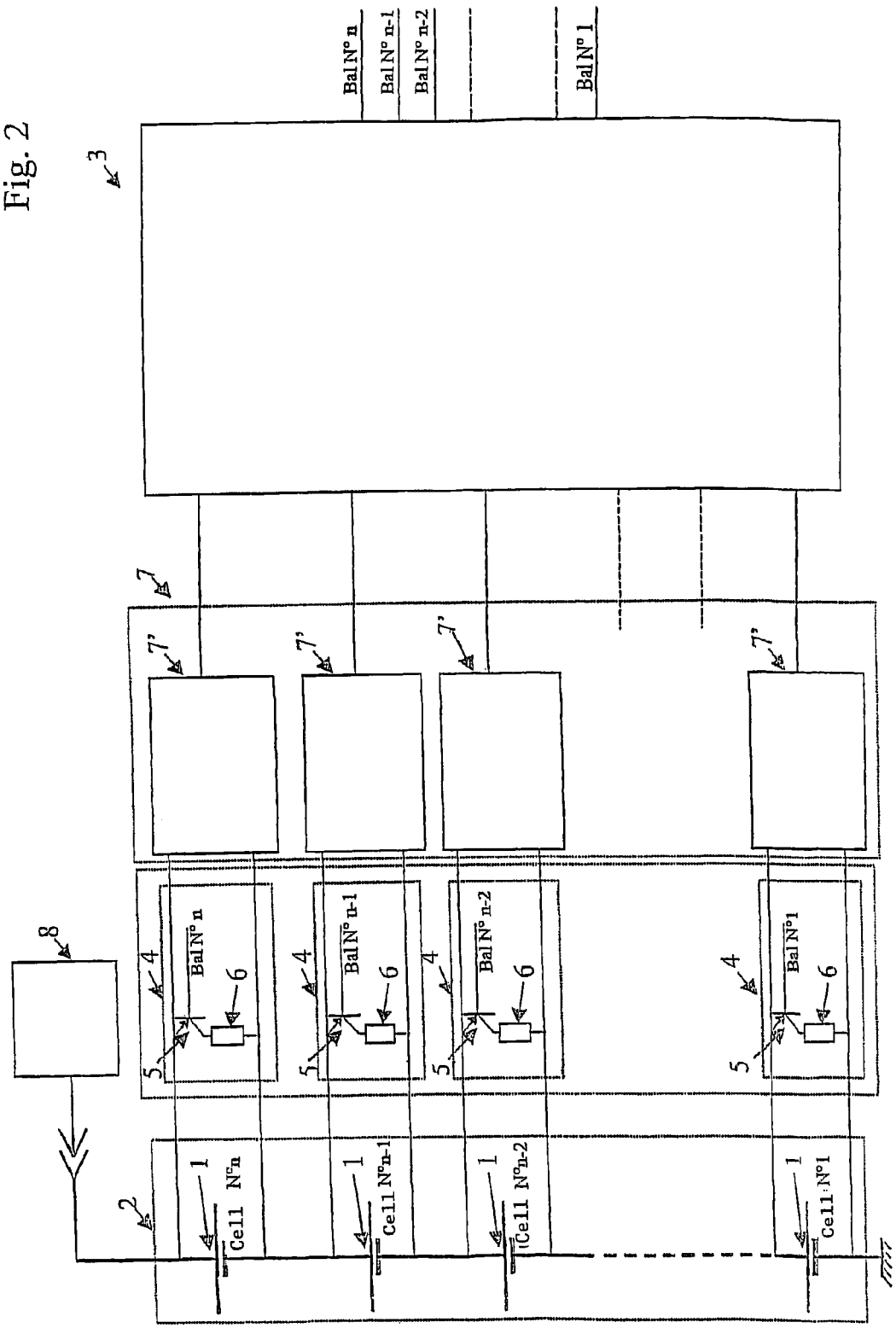
Figure 3:
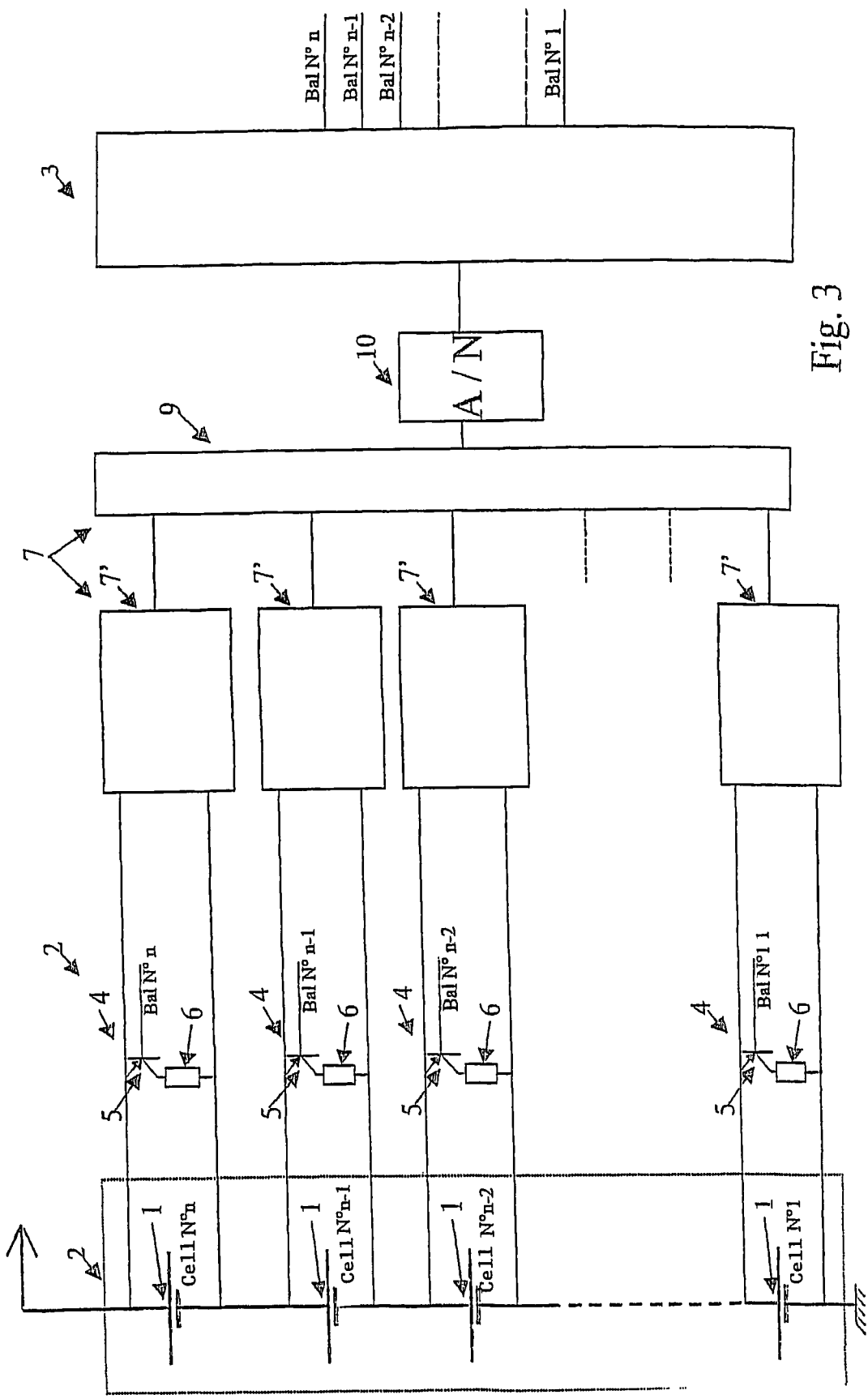
Figure 4:
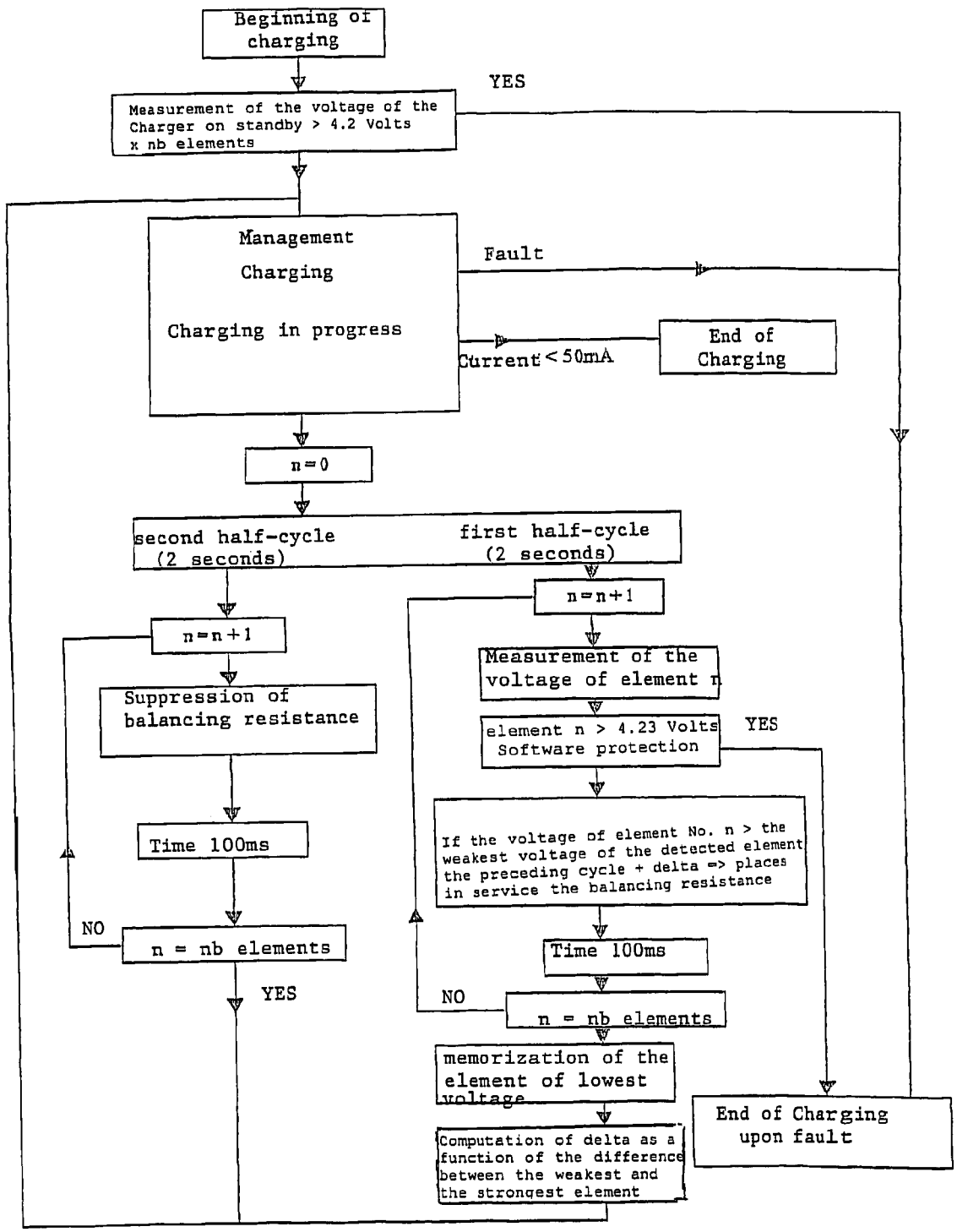
Figure 5:
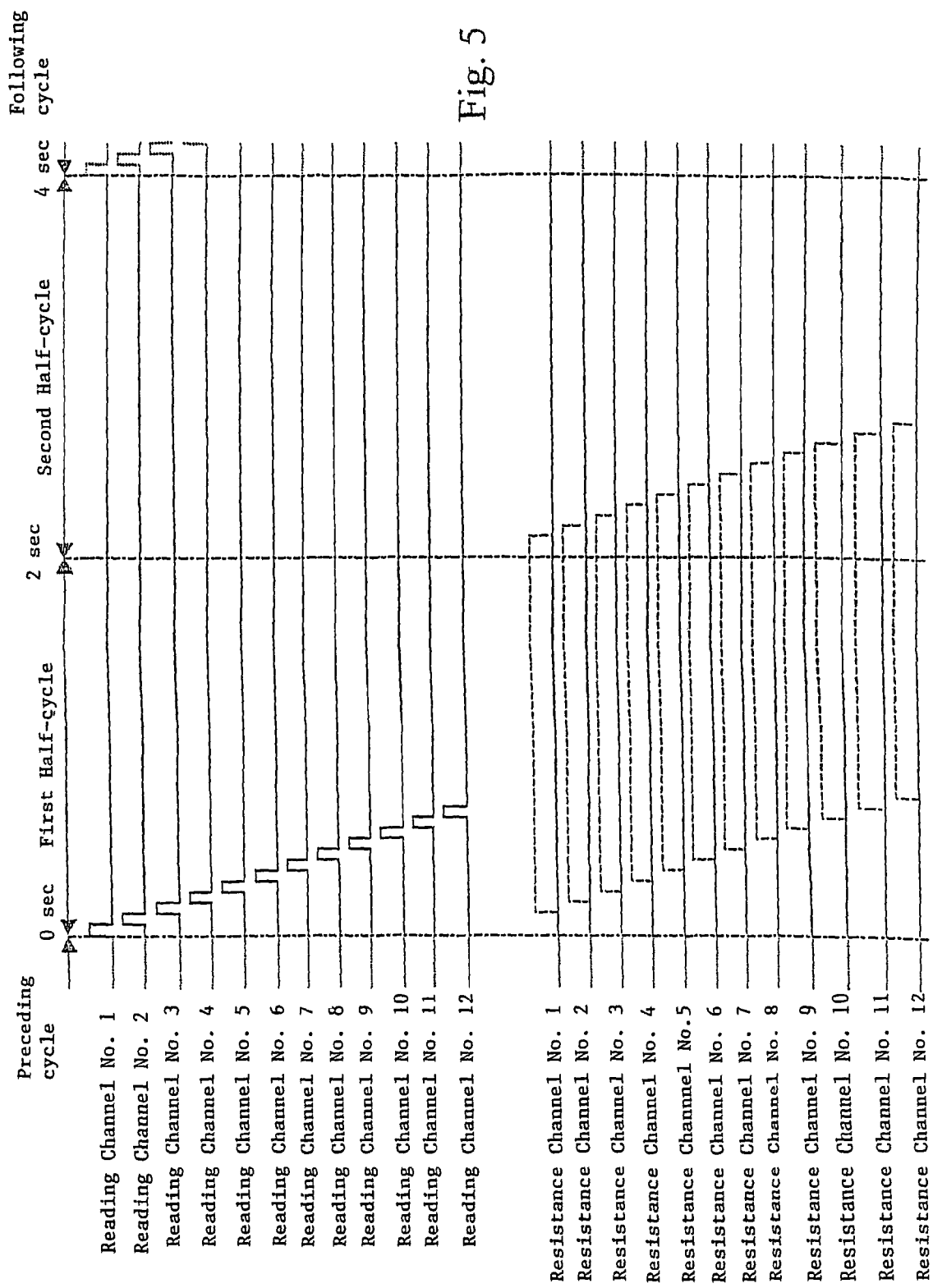

The invention will be better understood, from the following description, which relates to a preferred embodiment, given by way of non-limiting example, and explained with reference to the accompanying schematic drawings, in which:

FIG. 2 of the accompanying drawings is a synoptic diagram of a device for practicing the process of the invention;

FIG. 3 is a more detailed diagram of the device shown in FIG. 2, according to a modified embodiment of the invention;

FIG. 4 is an ordinogram showing schematically the different steps of the process according to one embodiment of the invention (in this ordinogram, it is necessary to understand by the term "element", an element or a cell with several elements in parallel) and, FIG. 5 shows chronograms illustrating by way of non-limiting example, for a battery of twelve cells, the operations carried out during a charging cycle with balancing according to the process of the invention.

This latter has for its object a process for charging or balanced charging of n cells 1, wherein $n \geq 2$, constituting a lithium ion or lithium polymer battery 2 and associated in series, each cell 1 being comprised by one or several elements mounted in parallel.

According to an advantageous embodiment of the invention, this process comprises at least the execution of the following operations under the management of a digital processing unit, and this from the beginning of the charge:

evaluation, preferably at regular intervals, of the quantity of energy stored in each cell 1 by measuring a parameter indicative of said quantity;

comparative analysis of the different quantities of energy evaluated or the different values of the measured parameter;

determination of the cell 1 most tardy in charging and, as the case may be, of the cell or cells 1 the most advanced in charging;

supplying the different cells 1 mounted in series in a uniform manner or with limitation of the charge current for the cells 1 other than the most retarded or the most advanced in charging, by derivation of all or a portion of said current in this or these latter;

sequential repetition of the different said operations until there is obtained an end of charging condition of the battery 2 or the detection of a fault, or a dysfunction or the exceeding of an admissible threshold value.

Preferably, the parameter measured in each cell 1 and used for the evaluation of the quantity of energy stored in this latter, is the voltage at the terminals of the cell 1 in question.

As indicated above, the limitations of the charging current can if desired affect all the cells in advance of charging relative to the least charged cell, as the case may be with different degrees of supply limitation.

However, so as further to spread out the active balancing phases, the invention preferably provides that only the cell or cells of the most advanced charging condition (during a given fractional duration n), will be subjected to limitation of charge (during the following fractional duration n+1). Thus, the cells whose charge level is only slightly greater than that of the least charged cell, will continue their normal charging.

The discrimination between the cells subjected to temporary limitation of the charge and those which are not (during a fractional time of the total charging time), can for example derive from the situation (in terms of values) of the levels of charge of these cells relative to a given threshold value by [value of the least charged cell+delta ($\Delta$)].

Moreover, by adopting the strategy of limiting the charge current of the most charged cells all during the charging of the battery, instead of waiting to the end of said charge, the invention permits avoiding any risk of overheating of the battery 2 because of late balancing and guarantees balanced voltages in the cells 1 at the end of charging.

Furthermore, by beginning the balancing as soon as the charge begins and by pursuing its action throughout the operation of charging, it is possible to guarantee a substantially balanced battery all during the charging operation, which is to say even in the case of interrupting of charging before its normal conclusion.

According to a preferred characteristic of the invention, the derivation of current in the most advanced cell in charging, is carried out by means of derivation circuits 4 each associated, by mounting in parallel, with one of said cells 1 (a circuit 4 for each cell 1), said circuits 4 each integrating a switching member 5 and, as the case may be, at least one component for dissipating electrical energy 6, if desired adjustable, such as for example an electrical resistance (FIGS. 2 and 3).

The switching member 5 could for example be selected from the group comprised by electromagnetic or electronic relays, bipolar transistors or with field effect or the like.

Moreover, the derivation of energy connected with balancing the charges of the different cells 1 being distributed over all the duration of charging, the switching component 5, as well as the dissipation component 6 associated therewith, can be optimized.

According to a preferred embodiment of the invention, the charging with sequential balancing consists more precisely in carrying out, by repeating over all the charging of the battery 2, the following operations:

a) scrutinizing one by one all the cells 1 of the battery 2 by measuring the voltages at their terminals, this without the resistances 6 of derivation or balancing being connected;

b) detecting the cell 1 which is tardiest to charge;

c) detecting the cells 1 which, relative to the cell 1 the tardiest to charge or the least charged, have an overcharge greater than a predetermined threshold value of spacing of capacitance, for example corresponding to a difference of voltage (dVs) of 10 mV;

d) individually connecting each cell 1 detected to have an overcharge greater than the threshold value, to a corresponding balancing resistance 6, so as to lead to decrease of the charging current for each of the cells 1 in question, for example by about 10%, during a predetermined sequential time, for example two seconds;

e) disconnecting the balancing resistances 6 of all the cells 1 after lapse of the predetermined sequential duration;

f) repeating the steps a) to e) after elapse of a stabilization delay of the voltages of the cells 1.

The charging of the battery is stopped normally when the intensity of the overall charging current of the assembly of cells of this latter falls below a predetermined threshold value, for example 50 mA.

By way of example of a way to practice the invention, the powers of the different derivation circuits 4 are selected to be near the values provided by the following formula:

$$Psd\ max = \frac{V\ max\ cell * \% * AH}{Tc}$$

in which:

Psd max=maximum power optimized to dissipate, expressed in watts;

Vmax cell=maximum voltage measured during charging at the terminals of a cell, expressed in volts;

%=ratio expressed in percentage, corresponding to the maximum spacing between two cells that it is desired to make up for during charging;

AH=nominal battery capacitance expressed in Ah (Ampere-hour);

Tc=time of battery charge expressed in hours.

Moreover, to provide precise and progressive regulation of the charging of each cell 1, the voltage at the terminals of each cell 1 is measured precisely by an assembly 7 of corresponding measuring modules 7', whose output signals are transmitted, preferably after digitization, to the digital processing unit 3, this latter controlling, in the following cycle, the switching members 5 of the different derivation circuits 4 as a function of the comparative development of said output signals provided by the modules 7'.

According to a very advantageous embodiment of the invention, referring by way of example to FIGS. 4 and 5, the operations are repeated, during each charging operation in a cyclic loop formed by two operational half cycles, executed successively in each cycle loop, a first half cycle comprising the consecutive execution of the following operations: successive reading of the voltages of the different cells 1 and triggering, offset in time, the balancing resistance 6 for each cell 1 whose difference of voltage (dV) with the cell 1 that is tardiest to charge of the preceding cycle, is greater than a threshold value (dVs), and the second half cycle comprising the following operations: successive disconnection of the balancing resistances 6 of the different cells 1 and awaiting the stabilization of the voltages of different cells 1 before their reading during a first half cycle of the following cycle, the two half cycles having preferably durations substantially similar, for example about 2 seconds.

Thanks to the cyclic repetitions of the operations of the two half cycles (with a cycle duration for example of 4 seconds), during all the procedure of charging the battery 2, that is until the occurrence of an end of charging event or of safety information, all the cells 1 (and the element or elements comprising each of these latter) have at any time a low dispersion of capacitance (because of the connections of constant charge between the cells) and recovering in optimum manner their maximum performances.

Moreover, the process according to the invention permits accepting at the beginning of charging the great charge differences between cells 1, and the "adjustment" or balancing being distributed over the entire duration of the charging procedure of the battery 2.

According to a first modification, it can be provided that the threshold value of difference of voltage dVs consists in a first predetermined fixed value V1, for example 10 mV, if the voltage difference dV between the voltage of the cell 1 having the highest voltage and the voltage of the cell 1 having the least voltage, is less than a second predetermined fixed value V2, greater than the first predetermined threshold value V1, for example 100 mV.

Moreover, it can thus also be provided that, if the voltage difference dV between the voltage of the cell 1 having the highest voltage and the voltage of the cell 1 having the lowest voltage is greater than a second predetermined fixed value V2, for example 100 mV, the threshold value of voltage difference dVs consists in a third predetermined fixed value V3 less than said second value V2, for example 30 mV.

Preferably, the third predetermined fixed value V3 is greater than said predetermined fixed first value V1.

According to a second modification, it can, in an alternative manner, be provided that the threshold value of the difference of voltage dVs corresponds to a given fraction of the difference of voltage dV, measured during the preceding cycle, between the voltage of the cell 1 having the highest voltage and the voltage of the cell 1 having the lowest voltage, if during the cycle in question, said difference of voltage dV is again greater than a fourth fixed predetermined value V4, for example 10 mV.

Advantageously in each of the two mentioned variations, and as already mentioned above, the measurements of the voltages of the different cells 1 are taken only after the elapse of a given delay, for example 2 seconds, following the suppression of the current derivatives, so as to permit a stabilization of the voltages at the terminals of said cells 1.

So as to preserve the cells 1 of the battery 2 from possible exposure to over-voltage, the management program of charging, whose ordinogram can for example correspond to that shown in FIG. 4, can comprise the execution of a certain number of tests before the beginning of the charge and in the course of and at the end of charging.

Thus, the charging process can consist, at the outset, before starting execution of the operations, in measuring the no load voltage Vo of the charger 8 connected to the battery 2 as to its charge, and in stopping said charging process, with possible triggering of a corresponding alarm and/or display of a message, if said no load voltage Vo is greater than [n×maximum permissible voltage Vmax for each cell 1].

Similarly, said process can also consist, before execution of a loop or a following cycle, in verifying whether at least one of the cells 1 of the battery 2 has at its terminal a voltage greater than the maximum permissible voltage Vmax (for example and not in a limiting sense 4.23 V) and, in the affirmative, interrupting the charging process, if desired with triggering of a corresponding alarm and/or display of a message.

The present invention also has for its object a device for practicing the process described above, of which the principal constituent elements are shown schematically in FIGS. 2 and 3.

This device is essentially constituted, on the one hand, by an assembly 7 of modules 7' for measuring the associated voltage at one of the cells 1 in series forming the battery 2 and measuring the voltages at the terminals of these latter, on the other hand, by a plurality of derivation circuits 4 each mounted in parallel with the terminals of a corresponding cell 1 and being adapted to be opened and closed selectively, and, finally, by a unit 3 for digital processing and management of the process, said unit 3 receiving the measurement signals from said assembly 7 of modules for measuring the voltage 7' and controlling the condition [closed/opened] of each derivation circuit 4.

The module 7' will consist for example in circuits for differential measurement of voltage with an operational amplifier, with a precision of measurement of at least 50 mV.

Preferably, each derivation circuit 4 comprises a switching member 5, forming a switch and whose condition is controlled by the digital processing unit 3 and, as the case may be, at least one component 6 for dissipation of electrical energy, such as for example one or more resistances.

As shown in FIG. 3 of the accompanying drawings, and according to a preferred embodiment of the invention, the assembly 7 of modules 7' for measuring the voltage comprises, on the one hand, n analog modules 7' for measuring voltage, each associated directly with a cell 1 of the battery 2, and on the other hand, in a multiplexer circuit 9 whose inputs are connected to the outputs of said module 7', and, finally, an analog/digital converter circuit 10 connected at its input to the output of the multiplexer circuit 9 and at its outlet to the digital processing and management unit 3.

As to a preferred application, and without limitation of the invention, the device shown in FIGS. 2 and 3 could desirably be integrated into a self-contained electric power tool assembly.

In this connection, it should be noted that the derivation circuits 4 associated individually with the cells 1 of the battery 2, could also be used if desired to adjust the charges of said cells 1 to a level compatible with long time storage, without use, of said battery 2.

Of course, the invention is not limited to the embodiments described and shown in the accompanying drawings. Modifications remain possible, particularly as to the construction of the various elements or by substitution of technical equivalents, without thereby departing from the scope of protection of the invention.

The invention claimed is:

1. Process for the balanced charging of a lithium ion or lithium polymer battery comprised of a series of n different cells (1), with n>2, each cell being comprised of elements mounted in parallel, said process comprising the steps of:
    continuously providing, from an onset of a charging operation of the battery (2) and throughout the charging operation, a surveillance of levels of charge of the different cells (1);
    carrying out, as a function of the surveillance of said charge levels, one of i) a uniform supply of all the cells (1), and ii) a balancing of said charge levels of said cells (1) by supplying said cells in a differentiated manner as a function of said cell's current levels of charge;
    triggering for each cell (1) of the battery, one cell after another cell in a sequential manner, for a fractional portion of the total charge time of the battery (2), sequences comprising a refreshed evaluation of the level of the charge of the cell (1) in question, followed, as a function of the cell's level of charge and with respect to all the levels of charge of the other cells (1) of the battery, a uniform or differentiated supply, according to a repeating cycle throughout the charging operation; and
    executing, from the beginning of the charging operation, the following operations under the management of a digital processing unit (3):
        A) evaluation of the quantity of energy stored in each cell (1) by measuring a parameter indicative of said quantity;
        B) comparative analysis of the different evaluated quantities of energy or of the different values of the measured parameter for each cell (1);
        C) determination of the cell (1) tardiest to charge and of the cell or cells (1) the most advanced in charging; and
        D) supplying the different cells (1) in one of i) a uniform manner and ii) with the limitation of charging current for the cells (1) other than the tardiest or for the cell or cells most advanced in charging, by derivation of all or a portion of said current at a limited level;
        with a sequential repetition of the operations A), B), C), and D) obtaining one of i) an end condition of charge of the battery (2) and ii) a detection of a fault, of a dysfunction or an exceeding of an admissible threshold value.

2. Process according to claim 1, wherein the measured parameter in each respective cell (1) utilized for evaluation of the quantity of energy stored in each respective cell is the voltage at the terminals of the respective cell (1).

3. Process according to claim 2, wherein charging with sequential balancing comprises the following further operations:
    a) scrutinizing one by one all the cells (1) of the battery (2) by measuring the voltages at the cell terminals, the voltage measurement being without the resistances (6) of derivation or balancing being connected;
    b) detecting the cell (1) tardiest to charge;
    c) detecting the cells (1) which, relative to the least charged or tardiest cell (1), have an overcharge greater than a predetermined threshold value of difference of capacity;
    d) individually connecting each cell (1) detected to have a surcharge greater than a threshold value, to a corresponding balancing component for dissipation of energy so as to produce a decrease of the charging current for each of the cells (1) in question during a predetermined sequential duration;

e) disconnecting the balancing components for dissipation of energy of all the cells (1) after lapse of the predetermined sequential duration; and f) carrying out again steps a) to e) after the elapse of a stabilization delay of the voltages of the cells (1).

4. Process according to claim 3, wherein the powers of the different derivation circuits (4) are selected to be near the values provided by the formula:

$$Psd\,max = \frac{V\,max\,cell * \% * AH}{Tc}$$

in which:

Psd max=maximum power optimized to dissipate, expressed in watts;

Vmax cell=maximum voltage measured during charging at the terminals of a cell, expressed in volts;

%=ratio expressed in percentage, corresponding to the maximum difference between two cells to compensate during charging;

AH=nominal capacitance of the battery expressed in Ah (Ampere-hours);

Tc=battery charge time expressed in hours.

5. Process according to claim 3, the component for dissipation of energy is a resistance.

6. Process according to claim 1, wherein derivation of current in the cell or cells most advanced in charging is carried out by derivation circuits (4) each associated by mounting in parallel with one of said cells (1), said circuits (4) each integrating a switching member (5) and at least one component for dissipation of energy (6).

7. Process according to claim 6, wherein the voltage at the terminals of each cell (1) is measured by an assembly (7) of corresponding measurement modules (7'), whose output signals are transmitted to the digital processing unit (3), the digital processing unit controlling, in the following cycle, the switching members (5) of the different derivation circuits (4) as a function of the comparative development of said output signals provided by the modules (7').

8. Process according to claim 6, the component for dissipation of energy is a resistance.

9. Process according to claim 6, the component for dissipation of energy is an adjustable resistance.

10. Process according to claim 1, wherein the charging of the battery (2) is normally stopped when the current intensity of the overall charge of the assembly of cells (1) descends below a predetermined threshold value.

11. Process according to claim 1, wherein, the operations are repeated, during all the charging operation, as a cyclic loop formed by two operational half cycles, carried out successively at each cycle loop, i) a first half cycle comprising the consecutive execution of successive reading of the voltages of the different cells (1) and triggering, offset in time, the balancing resistance (6) for each cell (1) whose voltage difference (dV) with the tardiest cell of the preceding cycle is greater than a threshold value (dVs), and ii) a second half cycle comprising the following operations: successive disconnection of the balancing resistances (6) of the different cells (1) and waiting for the stabilization of the voltages of the different cells (1) before their reading during the first half cycle of the following cycle, the two half cycles.

12. Process according to claim 11, wherein the threshold value of voltage difference (dVs) comprises in a first predetermined fixed value (V1) when the voltage difference (dV) between the voltage of the cell (1) having the highest voltage and the voltage of the cell (1) having the least voltage is less than a second predetermined fixed value (V2), greater than the first predetermined threshold value (V1).

13. Process according to claim 12, wherein, when the voltage difference (dV) between the voltage of the cell (1) having the highest voltage and the voltage of the cell (1) having the lowest voltage is greater than a second predetermined fixed value (V2) the threshold value of voltage difference (dVs) consists of a third predetermined fixed value (V3) less than said second value (V2).

14. Process according to claim 13, wherein the third predetermined fixed value (V3) is greater than said first predetermined fixed value (V1).

15. Process according to claim 11, wherein the threshold value of the difference of voltage (dVs) corresponds to a given fraction of the voltage difference (dv), measured during the preceding cycle between the voltage of the cell (1) having the highest voltage and the voltage of the cell (1) having the lowest voltage, when during the cycle taking place, said voltage difference (dV) is still higher than a fourth predetermined fixed value (V4).

16. Process according to claim 11, wherein the measurements of the voltages of the different cells (1) are carried out only after the elapse of a give delay following the suppression of the current derivations, so as to permit stabilization of the voltages at the terminals of said cells (1).

17. Process according to claim 11, further comprising, before the execution of a following loop, a step of verifying whether at least one of the cells (1) of the battery (2) has at the cell's terminals a voltage higher than the maximum admissible voltage (Vmax) and thereupon in interrupting the charging operation.

18. Process according to claim 1, further comprising, at the outset of the charging operation, before triggering the execution of the operations A), B), C), and D), in measuring the standby voltage (Vo) of a charger (8) connected to the battery (2), and stopping said charging operation upon a triggering of a corresponding arm or display of a message, when said standby voltage (Vo) is greater than n times (n*x) a maximum admissible voltage (Vmax) for each cell (1).

\* \* \* \* \*